United States Patent [19]

Miles

[11] Patent Number: 4,719,381

[45] Date of Patent: Jan. 12, 1988

[54] ELECTRICAL MACHINES AND APPARATUS FOR ROTATION AROUND MULTIPLE AXES

[75] Inventor: Arturo R. Miles, Rolla, Mo.

[73] Assignee: The Curators of the University of Missouri, Columbia, Mo.

[21] Appl. No.: 767,962

[22] Filed: Aug. 21, 1985

[51] Int. Cl.⁴ .......................... H02K 1/06; H02K 5/04

[52] U.S. Cl. .................................... 310/166; 74/5 R; 310/261

[58] Field of Search ................. 73/517; 74/5 R, 5.6 D, 74/572; 244/158, 164, 166, 176; 310/166, 208, 36, 261; 318/115, 766

[56] References Cited

U.S. PATENT DOCUMENTS

| Re. 27,289 | 2/1972 | Sawyer | 318/38 |
|---|---|---|---|
| Re. 27,436 | 7/1972 | Sawyer | 346/29 |
| 2,669,126 | 2/1954 | Simmons et al. | 74/5.6 |
| 3,178,600 | 4/1965 | Bers | 310/166 |
| 3,260,475 | 7/1966 | Ormsby | 244/1 |
| 3,668,443 | 6/1972 | Schwartz | 310/12 |
| 3,732,445 | 5/1973 | Laing | 310/90 |
| 3,741,690 | 6/1973 | Laing | 417/420 |
| 3,783,359 | 1/1974 | Malkiel | 318/254 |
| 3,851,196 | 11/1974 | Hinds | 318/115 |
| 4,051,401 | 9/1977 | Hayward | 310/216 |
| 4,503,377 | 3/1985 | Kitabayashi | 310/166 |
| 4,661,737 | 4/1987 | Barri | 310/261 |

FOREIGN PATENT DOCUMENTS

951586  8/1982  U.S.S.R. .............................. 310/261

OTHER PUBLICATIONS

*A Course in Electrical Engineering*, vol. II, by C. L. Dawes, 1947, pp. 305-312 and 423-425.
"Development and Design of Spherical Induction Motors", by Prof. F. C. Williams et al., *The Institution of Electrical Engrs.*, Paper No. 3036U, 1959, pp. 471-484.
"Magnetic Field, Parameters and Characteristics of Composite Motion Electric Motor", by G. Kaminski et al., *International Conf. on Elec. Machines*, 1982, Budapest, pp. 335-338.
"Elektryczny Silnik o Ruchu Zlozonym z Wirnikiem Kulistym", by M. Kant, *Przeglad Elektrotechniczny* R. LVII (undated), pp. 278-280 (No translation).
"Synchronizing (Selsyn) Devices", Sec. 11-11, undated, pp. 399-408.
"Operating Principle of the Induction Machine", undated, pp. 33-35.
"Servomotors", Chapter 16, undated, pp. 327-329.
"Magnetic Field of an Electric Motor of Three Degrees of Freedom", by J. Purczynski, *Archiwum Elektrotechniki* Tom XXIII, z. 2., 1974, pp. 455-467 (no translation).
"Electromagnetic Process Asynchron Spheric Polem Rotor", 1976, pp. 1231-1239 (No translation).
Russian publication, pp. 154-157 (No translation).
Russian publication, pp. 67-70 (No translation).
"Momenty ...", B. Lebedev et al., pp. 85-88 (No translation).
"Niektore Problemy Numerycznej Analizy Rozkladu Pola Elektromagnetyczenego w Silniku Elektrycznym o Ruchu Zlozonym", by M. Stabrowski et al., *Rozprawy Elektrotechniczne*, 1980.26.z.2, pp. 307-320 (no translation).
*An Introduction to Electrical Machines and Transformers*, by G. McPherson, 1981, p. 312.
*Electrical Machinery*, by A. E. Fitzgerald et al., 1961, pp. 316-320.

Primary Examiner—Patrick R. Salce
Assistant Examiner—D. L. Rebsch
Attorney, Agent, or Firm—Senniger, Powers, Leavitt and Roedel

[57] ABSTRACT

Electrical machines having a first assembly including first and second windings, both of which windings are approximately equally displaced from an axis. The first winding has conductors which are approximately parallel to the axis over most of their length, and the second winding has conductors which are approximately perpendicular to the axis over most of their length. A second assembly surrounds the first assembly and has a winding arrangement. The first assembly is rotatable within the second assembly around more than one axis upon electrical energization of the winding arrangement and of the first and second windings in the first assembly. Also described is electrical apparatus including means for adjustably controlling the relative phases of the set of alternating currents and connected with the electrical machine.

27 Claims, 17 Drawing Figures

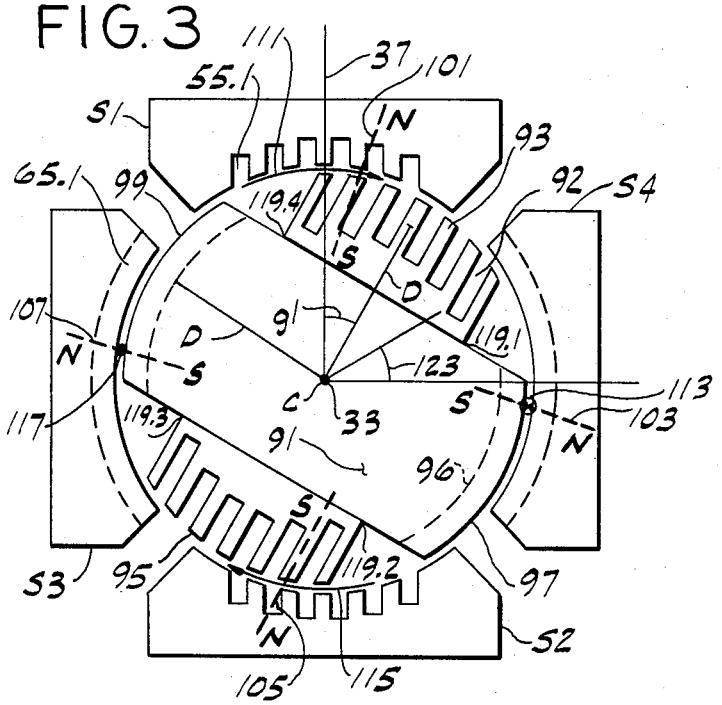
FIG. 3
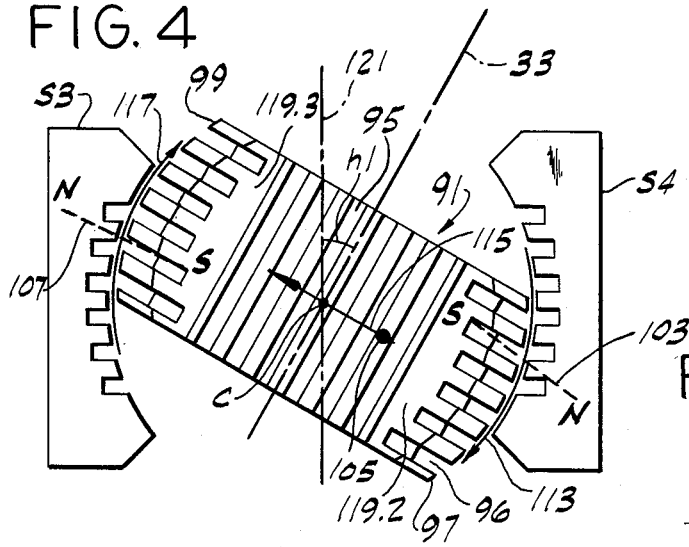
FIG. 4
FIG. 5
FIG. 6

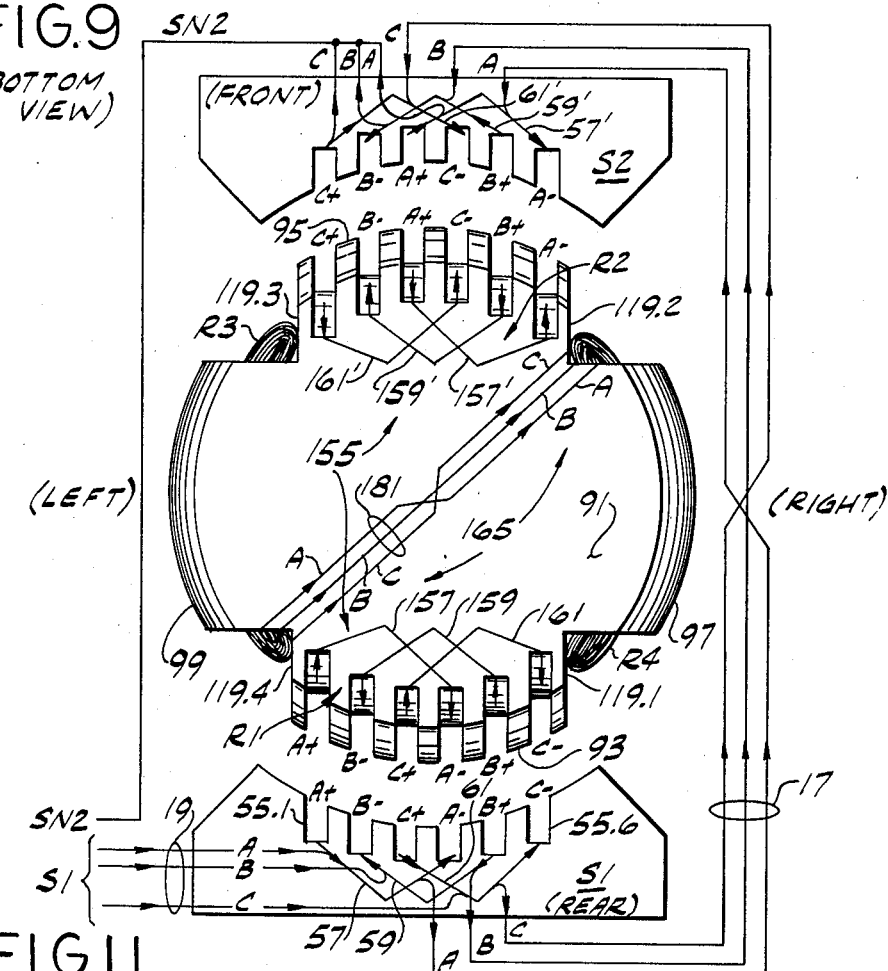
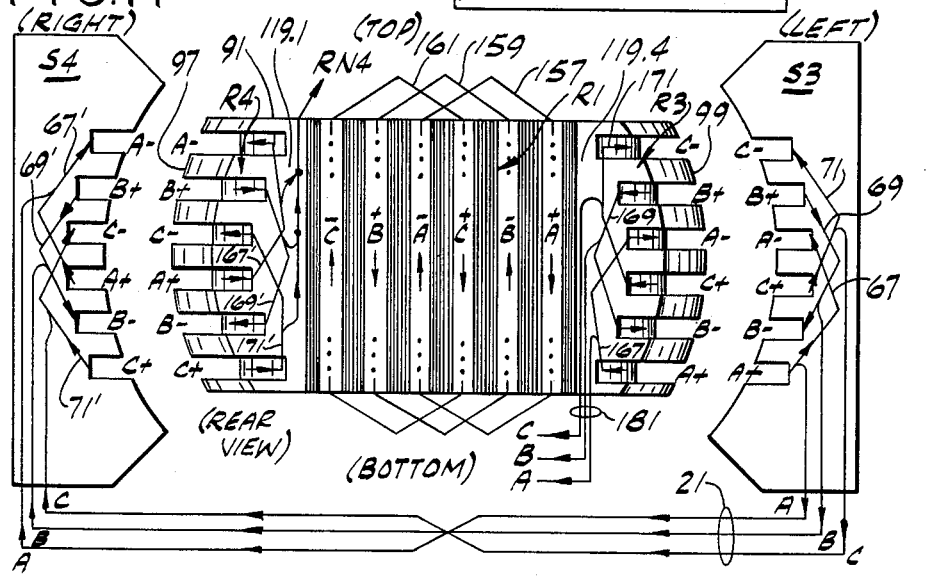

ELECTRICAL MACHINES AND APPARATUS FOR ROTATION AROUND MULTIPLE AXES

BACKGROUND OF THE INVENTION

The present invention relates to electrical machines and apparatus. More specifically, the present invention relates to electrical machines having first and second assemblies movable around more than one axis relative to each other and to apparatus in which such an electrical machine is combined with a circuit for adjusting a set of electrical currents for controlling the machine.

Bers U.S. Pat. No. 3,178,600 shows a structure having continuous helical coils with turns wound on concentric spherical members of high magnetic permeability. Rotation is permitted around just one axis.

Ormsby U.S. Pat. No. 3,260,475 shows a space vehicle directing apparatus with a hollow stainless steel rotor ball suspended in the vehicle by high electric fields. Magnetic fields are applied to induce a current in the rotor ball to magnetically effect a torque on it. An equal and opposite reaction torque turns the vehicle in space. Six substantially semicircular stator coil windings with wires interwound in a core of magnetic material are fixed to a housing and placed about the rotor ball in three mutually perpendicular planes.

F.C. Williams et al. "Development and Design of Spherical Induction Motors," Inst. Electrical Engineers Proceedings, Vol. 106, Part "A", pp. 471–484, Dec. 1959, describes motors with two or four stator blocks wound with a polyphase winding to produce a field travelling across the block. The inside surface of the block is part of a sphere which is concentric with the spherical surface of a rotor which can carry current in any surface direction. By rotating the stator block(s) the speed of the rotor can be varied.

G. Kaminski et al. "Magnetic Field, Parameters and Characteristics of Composite Motion Electric Motor" International Conference on Electric Machines, Budapest, 1982, pp. 335-338 shows spherical motors said to have two or three degrees of freedom. There is a hollow iron ball armature with a smooth surface of copper and chrome. One magnetic circuit of an "inductor" (separated from the ball by an air gap) is said to have two groups of slots in which are located two windings, which produce components of magnetic field perpendicular to each other.

It is believed that the foregoing devices need to be improved for more stable positioning and effective orientation sensing and for other purposes in a variety of fields including prosthetics, electric control systems, and robotics.

SUMMARY OF THE INVENTION

Among the objects of the present invention are to provide improved electrical machines and apparatus for stably positioning a mass relative to more than one axis; to provide improved electrical machines and apparatus with at least one movable member which is smoothly, accurately, and rapidly adjustable from a first position to a second position relative to more than one axis; to provide improved electrical machines and apparatus which directly provide linear motions without a mechanical converter; to provide improved electrical machines and apparatus which can be used to accurately maintain an orientation of a mass relative to more than one axis without requiring orientation sensors; to provide improved electrical machines and apparatus which can themselves be used for two-dimensional orientation sensing when desired; to provide improved electrical machines and apparatus which can be used as artificial joints which at least somewhat resemble biological joints and limbs in arrangement and motions; to provide improved electrical machines and apparatus which have a shaft that can be electrically turned around at least two axes and then held substantially fixed at a new position; to provide improved electrical machines and apparatus of the foregoing types which do not require high voltage electrical fields for suspension purposes; to provide improved electrical machines and apparatus of the foregoing types which are compatible with readily available electrical power sources in industrial and other environments; to provide improved electrical machines and apparatus of the foregoing types which have a balanced weight distribution and which can be constructed as inexpensively and with as little structural complication as possible; and to provide improved electrical machines which are compact, low in vibration, reliable and versatile.

Other objects and features will be in part apparent and in part pointed out hereinafter.

Generally, a first form of the invention is an electrical machine that has a first assembly including first and second windings, both of which windings are approximately equally displaced from an axis. The first winding has conductors which are approximately parallel to the axis over most of their length, and the second winding has conductors which are approximately perpendicular to the axis over most of their length. A second assembly surrounds the first assembly and has a winding arrangement. The first assembly is rotatable within the second assembly around more than one axis upon electrical energization of the winding arrangement and of the first and second windings in the first assembly.

In general, another form of the invention is an electrical machine for use with means for adjustably controlling the relative phases of a set of alternating currents. The electrical machine includes a rotor having a first winding assembly and a stator having a second winding assembly, and the rotor is free to rotate inside of the stator around more than one axis. The first and second winding assemblies have terminals for connection to the controlling means and are arranged so that the alternating currents flow in the first and second winding assemblies to produce a first magnetic field moving approximately circumferentially over the rotor and correspondingly along the stator, and to simultaneously produce a second magnetic field moving approximately longitudinally elsewhere over the rotor and moving correspondingly along the stator. The first and second moving magnetic fields hold the rotor in a fixed position relative to the stator which position is adjustable by adjusting at least the relative phases of the currents from the controlling means flowing in the first and second winding assemblies.

In general, a further form of the invention is an electrical apparatus including the means for adjustably controlling the relative phases of the set of alternating currents connected with the electrical machine described in the previous paragraph.

BRIEF DESCRIPTION OF THE DRAWINGS

FIG. 3 is a simplified plan view of the electrical machine of FIG. 1 showing the rotor turned to one angular position around its axis and showing moving magnetic fields which adjustably hold the rotor in place;

FIG. 4 is a simplified elevation view of the electrical machine of FIG. 1 showing the rotor tilted and showing the moving magnetic fields which adjustably hold the rotor in place;

FIG. 5 is a phasor diagram of three sets of three-phase electric currents for energizing the electrical machine of FIG. 1;

FIG. 6 is a diagram of some maneuvers which are executed by the rotor of the electrical machine of FIG. 1;

FIG. 9 is a view from the bottom of the rotor and the two stator blocks of FIG. 7 showing more winding details;

FIG. 11 is a simplified rear elevation view of the rotor and the stator blocks of FIG. 10 showing more winding details;

Corresponding reference characters indicate corresponding parts throughout the several views of the drawings.

DETAILED DESCRIPTION OF PREFERRED EMBODIMENTS

Figure 1:
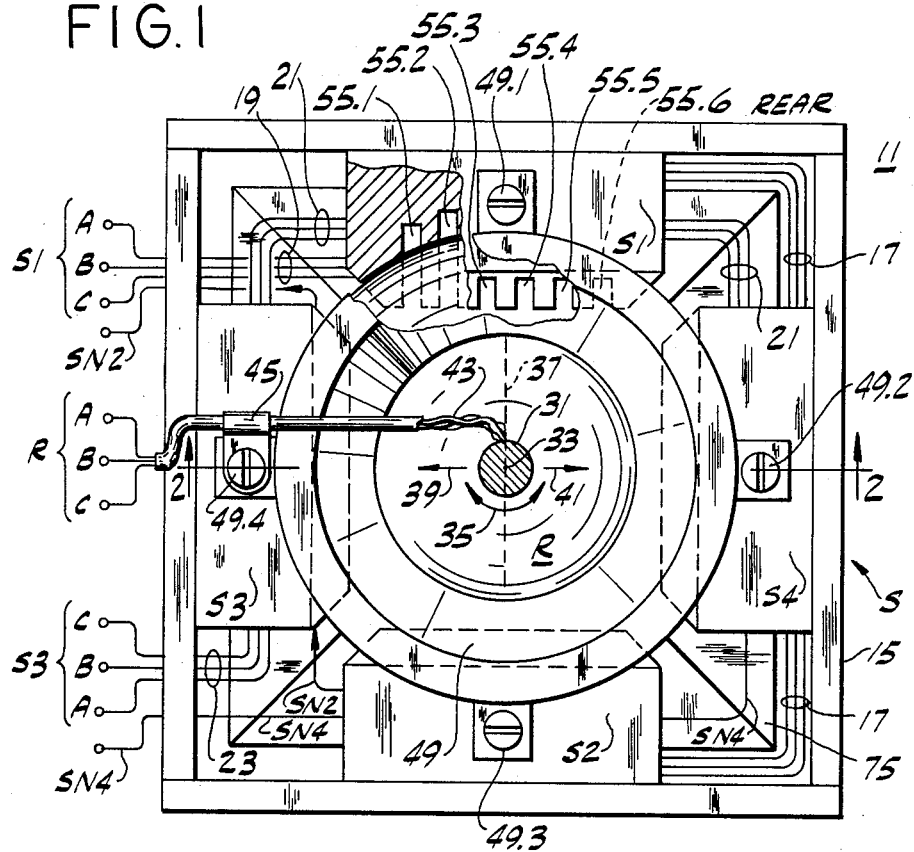
FIG. 1 is a plan view, partly sectioned, of an electrical machine of the present invention.

In FIG. 1 a preferred embodiment of the invention is an electrical machine 11 which has a stator S and a rotor R. Stator S has slotted magnetically permeable stator blocks S1, S2, S3, and S4 with windings (not shown) in the slots. The stator blocks S1–S4 are firmly supported by a stator housing 15 which is made of magnetically permeable or other material for holding the stator blocks centered on sides of a square and for completing the magnetic circuit of the machine 11 when any particular winding arrangements of the rotor R and stator S require it. The windings of stator blocks S1 and S2 are connected by a three wire cable 17, which passes beneath stator block S4. The stator windings for the two stator blocks S1 and S2 are connected as a three-phase wye brought out on a three wire cable 19 to A, B, and C terminals from stator block S1, with a wye neutral SN2 brought out from the windings on stator block S2. The windings of stator blocks S3 and S4 are connected by a three wire cable 21, which passes beneath stator block S1. The stator windings for the two stator blocks S3 and S4 are also connected as a three-phase wye and are brought out on a three wire cable 23 to additional A, B, and C terminals from stator block S3, with a wye neutral SN4 brought out from the windings on stator block S4.

Rotor R has a shaft 31 which is free to rotate around a first axis 33 (into the paper) in the direction of arrows 35. Also shaft 31 is free to rotate around a second axis 37 perpendicular to the first axis 33 in the direction of arrows 39 and 41. Windings in the rotor R are brought out on three flexible stranded insulated wires 43 which have sufficient length to permit free movement of the rotor R and which are supported by a cable clamp 45. Wires 43 terminate in further A, B, and C terminals for the rotor R. A top collar 49 mounted by four screws 49.1–49.4 to stator blocks S1–S4 provides mechanical protection and, if necessary, support for rotor R.

Electrical machine 11 is actually at least two electrical machines combined into one, the twin spherical construction of which eliminates a mechanical converter for transforming rotary motion to linear motion, for instance, and achieves shaft motion with more than one degree of freedom.

Figure 2:
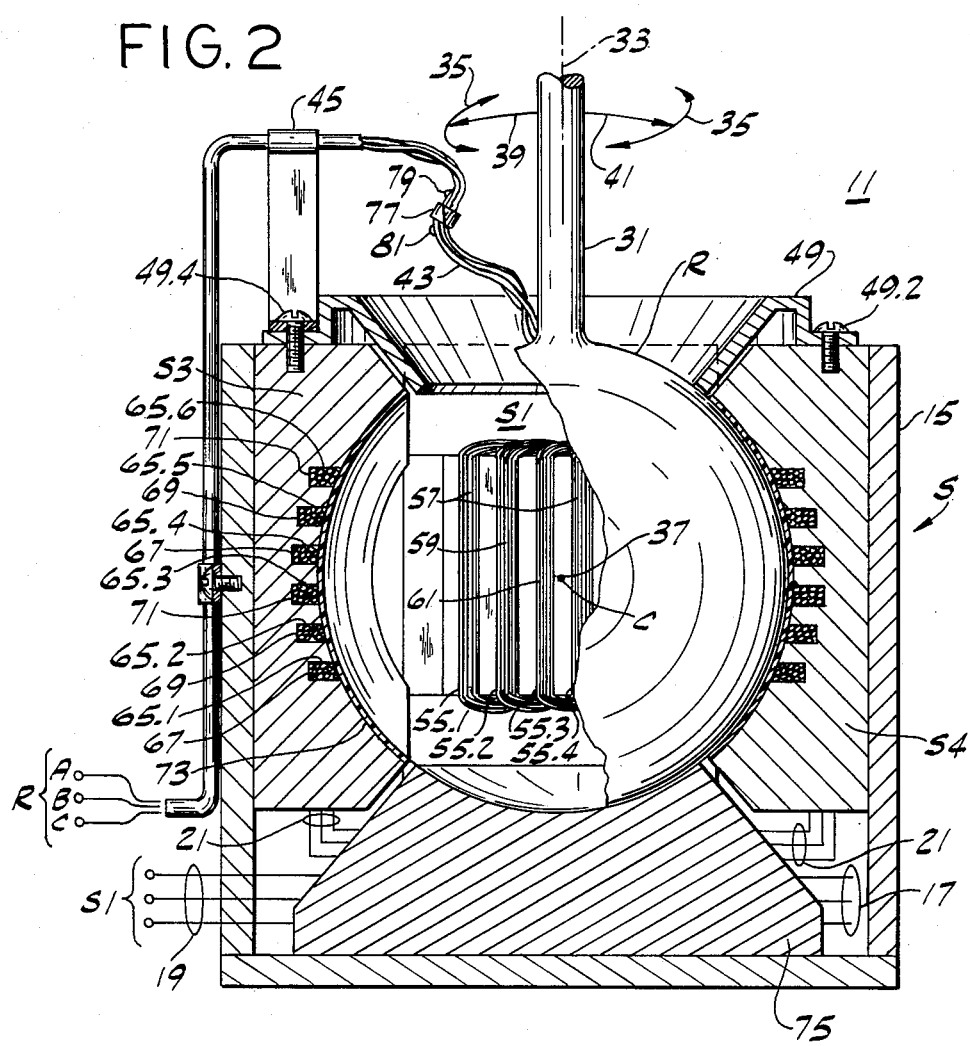
FIG. 2 is an elevation view of the electrical machine of FIG. 1 with a stator shown in section and with part of a rotor cut away to show more of the stator.

In FIGS. 1 and 2 further details of the electrical machine of FIG. 1 are shown in section. Stator blocks S1–S4 have curved inner faces conforming in shape to a spherical outer surface of rotor R. Stator block S1 has six vertical slots 55.1–55.6 in its curved face in which are placed three overlapping generally oval winding coils 57, 59 and 61 having two columns of conductors each. Coil 57 occupies slots 55.1 and 55.4, coil 59 occupies slots 55.2 and 55.5, and coil 61 occupies slots 55.3 and 55.6. Stator block S2 is provided with a set of three overlapping coils corresponding to the coils 57, 59, and 61 of stator block S1 and is advantageously made identical to stator block S1.

Stator block S3 has six horizontal slots 65.1–65.6 in which are also placed three overlapping generally oval winding coils 67, 69 and 71 with two rows of conductors each. Coil 67 occupies slots 65.1 and 65.4, coil 69 occupies slots 65.2 and 65.5, and coil 71 occupies slots 65.3 and 65.6. Stator block S4 is provided with a set of three overlapping coils corresponding to the coils 67, 69, and 71 of stator block S3 and is advantageously made identical to stator block S3.

Stator blocks S1–S4 are conveniently constructed of laminations of magnetically permeable material such as electrical steel for low eddy current and hysteresis losses. Alternatively, sintered powdered iron composite material is molded to shape, or other suitable magnetically permeable materials are used. The coils are wound as individual ovals separate from the stator blocks and then pressed into the slots of the stator blocks. A smooth inner surface 73 of epoxy, acrylic or other suitable compound with compatible thermal expansion coefficient is molded over the stator blocks and coils Rotor R is made similarly with a molding compound molded completely around it to form shaft 31 and a spherical body which is snugly and movably nestled within the stator blocks. A curved pedestal 75 made of brass or hard plastic lies beneath rotor R. Motion of rotor R is facilitated by a lubricant grease between the rotor and surface 73 of the stator blocks. Flowing liquid or gaseous fluid can be introduced between the rotor R and the stator blocks for friction-reducing and cooling purposes. An alternative construction employs two sets of three ball bearings (not shown) mounted between collar 49 and rotor R and between pedestal 75 and rotor R so that rotor R rides on the ball bearings.

A cut plastic ring 77 is put around wires 43 intermediate rotor R and cable clamp 45 to keep the wires together while permitting them to slip past each other and minimize any forces on rotor R due to the presence of wires 43. Dots of glue 79 and 81 are applied to one of the wires 43 to keep cut ring 77 in position.

FIGS. 3 and 4 are simplified plan and elevation views of the stator blocks S1–S4 which also show a rotor core 91 of magnetically permeable material for rotor R provided with six vertical slots 92 on each of a pair of opposite faces 93 and 95 adjacent to the stator blocks S1 and S2. Six horizontal slots such as slot 96 are provided on each of another pair of opposite faces 97 and 99 adjacent to the stator blocks S3 and S4. The rotor core 91 has windings (shown in FIGS. 7, 9, 10, and 11)) placed in the slots in the same manner as windings 57, 59, 61, 67, 69, and 71 are placed in the slots 55.1–55.6 and 65.1–65.6 of the stator blocks of FIGS. 1 and 2. The windings are compartmentalized to their faces and the rotor core 91 acts as a means for holding the windings apart from each other. The rotor slots and thus the rotor windings are oriented perpendicular to each other on adjacent faces (e.g. faces 93 and 97) in being generally vertical (longitudinal or parallel to axis 33) or horizontal (circumferential or perpendicular to axis 33).

The rotor windings and the rotor as a whole have an advantageously symmetrical mass distribution in that the windings are displaced approximately equal distances D from axis 33. As such, rotor R constitutes a first assembly including first and second windings both of which windings are approximately equally displaced from an axis (e.g. axis 33 into the plane of the paper), the first winding having conductors which are approximately parallel to the axis over most of their length, and the second winding having conductors which are approximately perpendicular to the axis over most of their length.

The rotor core 91 constitutes a magnetically permeable core having a first pair of faces (e.g. 93 and 95) with slots which are approximately longitudinal and a second pair of faces (e.g. 97 and 99) with slots which are approximately circumferential wherein the first pair of faces are opposite each other on the rotor and the second pair of faces are also opposite each other on the rotor.

Also, the rotor core 91 constitutes a magnetically permeable core having a first face (e.g. face 93) with slots which are approximately parallel to the axis, the first winding conductors resting in the slots of the first face, the core also having a second face (e.g. face 97) with slots which are approximately perpendicular to the axis, the second winding conductors resting in the slots of the second face.

The stator constitutes a second assembly surrounding the first assembly and having a winding arrangement, the first assembly being rotatable within the second assembly around more than one axis upon electrical energization of the winding arrangement and of the first and second windings in the first assembly.

The stator includes the stator blocks and third and fourth windings and constitutes the second assembly which has a first magnetically permeable block (e.g. S1) with approximately parallel slots, the third winding conductors resting in the slots of said first block, the second assembly also including a second magnetically permeable block (e.g. S3) with slots which are approximately parallel to each other and approximately perpendicular to the slots of the first block, the fourth winding conductors resting in the slots of the second block. The stator windings are compartmentalized to the stator blocks which act as means for holding the third and fourth windings apart.

Electrical machine 11 is used with means for adjustably controlling the relative phases of a set of alternating currents, examples of controlling means being described hereinbelow in connection with FIGS. 13 and 14. By way of illustration and not limitation, the set of alternating currents can be a set of three groups I1, I2, and I3 of three-phase alternating currents shown in phasor form in FIG. 5, where the group of currents I2 leads the group I1 by an angle g, and the group of currents I3 lags the group I1 by an angle h.

The electrical machine 11 includes a rotor (e.g. R) which has a first winding assembly, and a stator (e.g. S) having a second winding assembly, the rotor being free to rotate inside of the stator around more than one axis. The first and second winding assemblies have terminals (e.g., the sets of terminals A, B, and C of FIG. 1) for connection to the controlling means and are arranged so that the alternating currents flow in the first and second winding assemblies to produce first and second moving magnetic fields 101 and 103, see FIGS. 3 and 4.

For illustration, the moving magnetic fields 101 and 103 are shown in FIGS. 3 and 4 as heavy dashed lines joining north (N) and south (S) magnetic poles on the stator blocks and rotor faces respectively, with additional moving magnetic fields 105 and 107 completing the symmetry of the preferred embodiment. It will be understood that the actual magnetic fields are complex varying and moving distributions of magnetic flux density in the stator and rotor and in the space between them. The first magnetic field 101 moves approximately circumferentially clockwise over the rotor and correspondingly along the stator as indicated by arrow 111. The second magnetic field 103 simultaneously moves approximately longitudinally elsewhere over the rotor and moves correspondingly along the stator as indicated by an "x" down-arrow 113 into the plane of the drawing in FIG. 3. In symmetrical fashion circumferentially moving magnetic field 105 moves clockwise in direction 115 in the plan view of FIG. 3. Longitudinally moving field 107 moves longitudinally upward as indicated by a "." up-arrow 117 out of the plane of the drawing in FIG. 3. Moving magnetic fields 103 and 107 both move clockwise in elevation as shown in FIG. 4. The first and second moving magnetic fields 101 and 103, as well as the fields 105 and 107, hold the rotor in a fixed position relative to the stator which position is adjustable by adjusting at least the relative phases (e.g. angles g and h) of the currents from the controlling means flowing in the first and second winding assemblies.

If the rotor R is not subjected to any mechanical torque due to external forces or due to its own weight distribution, then so long as the N and S poles are radially located, there is no torque of magnetic origin on rotor R and the rotor remains in position even if the magnetic fields are moving. Advantageously, attempts to mechanically displace the rotor from such position results in a countertorque which resists movement from the equilibrium position determined by the moving magnetic fields resulting from currents I1, I2, and I3 with their electrical phase angles g and h. More generally speaking, as long as the orientation of the N and S poles is such as to produce a torque of magnetic origin on rotor R which is equal and opposite to any torque of mechanical origin, then the rotor remains stationary even if the magnetic fields are moving. Altering the electrical relationship of the currents in the stator and rotor, such as in phase, amplitude, frequency, waveshape or other parameters causes the rotor to move and find a new equilibrium position if one exists. Unlike some devices sometimes called spherical motors which use induced currents in a conductive rotor ball to turn the rotor, the use of this multi-dimensional moving magnetic field approach allows stable positioning of the rotor with respect to two axes in a compact volume.

In FIGS. 3 and 4 each face 93, 95, 97 or 99 of the rotor core 91 subtends an angle of about 60° both longitudinally and circumferentially relative to a center C defined by the intersection of the axes 33 and 37 (see FIGS. 2 and 4). Notches 119.1-119.4 separate the faces. In the preferred embodiment, it is intended that the rotor be displaceable through an azimuth angle g1 of approximately plus or minus 30° as shown in FIG. 3 and sequentially or even simultaneously also through a tilt angle h1 of approximately plus or minus 30° as shown in FIG. 4. Tilt angle h1 is defined relative to a stator axis of symmetry 121 from which the stator blocks are approximately equidistant. Electrical and magnetic end effects which might otherwise influence the behavior of the rotor are minimized because of an approximately 30° azimuthal effective gap 123 left between adjacent rotor faces and between adjacent stator blocks. This gap 123 subtends an angle equal to one-fourth of the difference between a full circle (360°) and 4 times the angle subtended by each rotor face.

FIG. 6 illustrates how the rotor can be made to execute various maneuvers. The rotor axis 33 can be tilted right as shown by arrow 131 of FIG. 6 and then, while tilted, be rotated through an azimuthal angle as shown by arrow 133 or arrow 135. Motions represented by arrow 131 followed by arrow 133 attain a position 137. It is noted that position 137 is not the same as a position 139 which is attained by motion through half of the maneuver represented by arrow 131, followed by the full maneuver through the angle represented by arrow 133 (see arrow 141), followed by the other half of the arrow 131 maneuver (see arrow 143). Consequently, the characteristics of such three-dimensional maneuvering are important in various servomechanical applications. Arrows 145, 147, and 149 are shown to illustrate maneuvers in an opposite range of travel tilting to the left.

Figure 7:
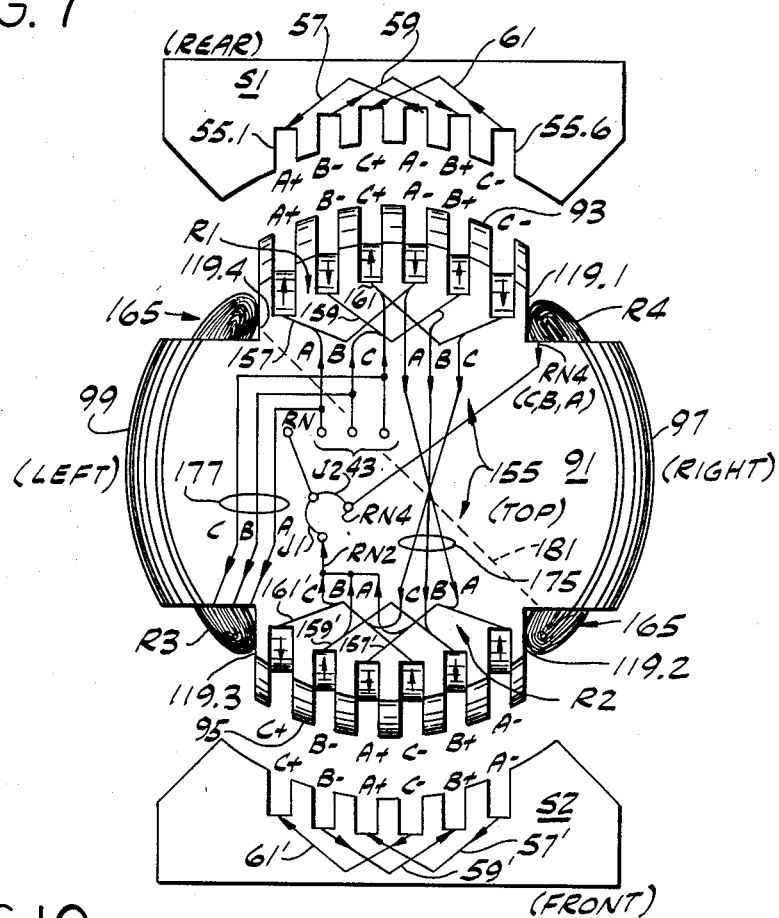
FIG. 7 is a simplified plan view of the rotor and two stator blocks showing some of the windings of the electrical machine of FIG. 1;.

FIG. 7 illustrates a first winding 155 of the rotor for the longitudinal slots of opposite faces 93 and 95 wherein the first winding 155 is a polyphase winding with three overlapping phases or parts formed by overlapping coils 157, 159, and 161 resting in the slots of face 93 connected in series respectively with three overlapping coils 157', 159', and 161' resting in the slots of the opposite face 95. In constructing the rotor, the coils are made in the same way as the stator coils and placed in the longitudinal slots of the rotor core 91 in the same way as the stator coils are placed in the vertical slots of the stator blocks S1 and S2. Coils 157, 159, and 161 are collectively called a coil set R1 and coils 157', 159' and 161' are collectively called coil set R2. The adjacent corresponding coils on stator block S2 are marked 57', 59' and 61'. In FIG. 7, as well as FIGS. 9-11, the gaps between the rotor faces and the stator blocks are exaggerated for clarity.

Figure 10:
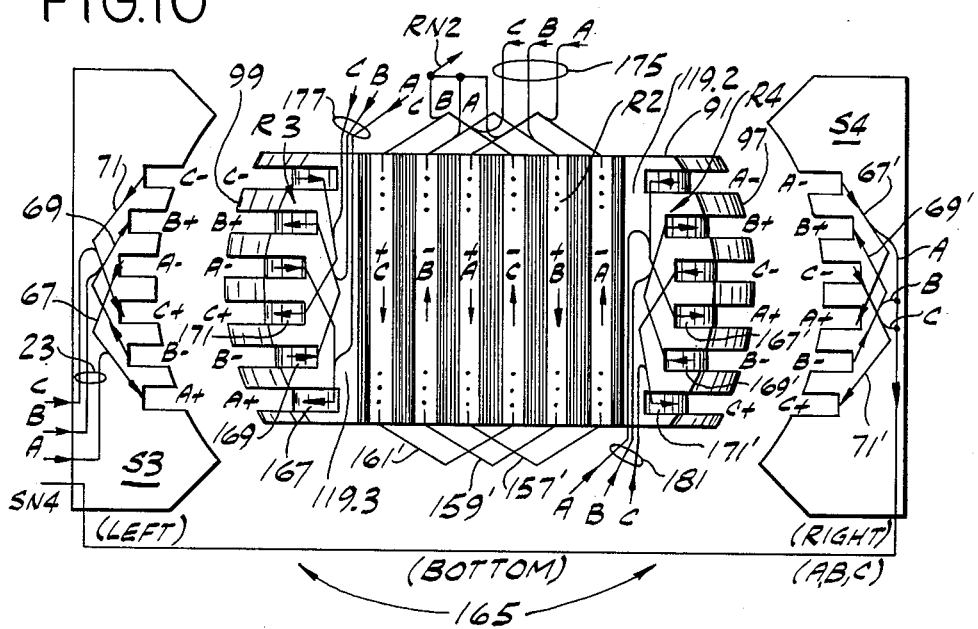
FIG. 10 is a simplified front elevation view of the rotor and the other two stator blocks to further illustrate the windings of the electrical machine of FIG. 1.

Also provided on rotor core 91 is a second winding 165 of the rotor for the horizontal slots of opposite faces 97 and 99 wherein the second winding 165 is a polyphase winding shown in FIG. 10 with three overlapping phases or parts formed by overlapprng coils 167, 169, and 171 resting in the slots of face 99 and connected in series respectively with three overlapping coils 167', 169', and 171' resting in the slots of the opposite face 97. In constructing the rotor, these coils are also made in the same way as the stator coils and placed in the circumferential slots of the rotor core 91 in the same way as the stator coils are placed in the horizontal slots of the stator blocks S3 and S4. Coils 167, 169, and 171 are collectively called a coil set R3 and coils 167', 169' and 171' are collectively called coil set R4.

The rotor wound as shown in FIGS. 7 and 9-11 constitutes a first assembly that includes a magnetically permeable core having a first pair of faces with slots which are approximately parallel to the axis, the first winding having at least three overlapping parts resting in the slots of the first pair of faces, the core having a second pair of faces with slots which are approximately perpendicular to the axis, and the second winding having at least three overlapping parts resting in the slots of the second pair of faces. The first assembly is rotatable to a position relative to a second assembly (e.g. the stator) at which position first and third windings (e.g. longitudinal rotor winding and vertical stator winding) lie adjacent to each other and second and fourth windings (e.g. circumferential rotor winding and horizontal stator winding) lie adjacent to each other (see e.g. FIGS. 7 and 10).

The adjacent corresponding coils on stator block S4 are marked 67', 69' and 71'. Coils 57, 59, 61, 57', 59' and 61' collectively constitute a polyphase third winding included in the winding arrangement of the second assembly (e.g. the stator). Coils 67, 69, 71, 67', 69' and 71' collectively constitute a polyphase fourth winding approximately perpendicular to the third winding and included in the winding arrangement of the second assembly.

The stator thus constitutes a second assembly that further includes a first magnetically permeable block with approximately parallel slots, the third winding having at least three overlapping parts resting in the slots of the first block, the second assembly also including a second magnetically permeable block with slots which are approximately parallel to each other and approximately perpendicular to the slots of the first block, the fourth winding having at least three overlapping parts resting in the slots of the second block.

Each moving magnetic field 101, 105, 107, and 103 is produced by and moves across its respective polyphase coil set R1, R2, R3 and R4 in cycles of N and S poles on each rotor face. Advantageously, the 60 degree physical angle subtended by each rotor face corresponds to 360 electrical degrees in each cycle of magnetic poles. This means that there is a 6:1 vernier effect because the rotor orientation angles g1 and h1 can be adjusted very finely between plus and minus 30 degrees by much larger or coarser adjustments of the electrical phase angles g and h between plus and minus 90 degrees.

The rotor core 91 is wound with many turns of enameled or otherwise insulated wire. The winding example shown in the drawings is based on several considerations, now described.

Figure 8:
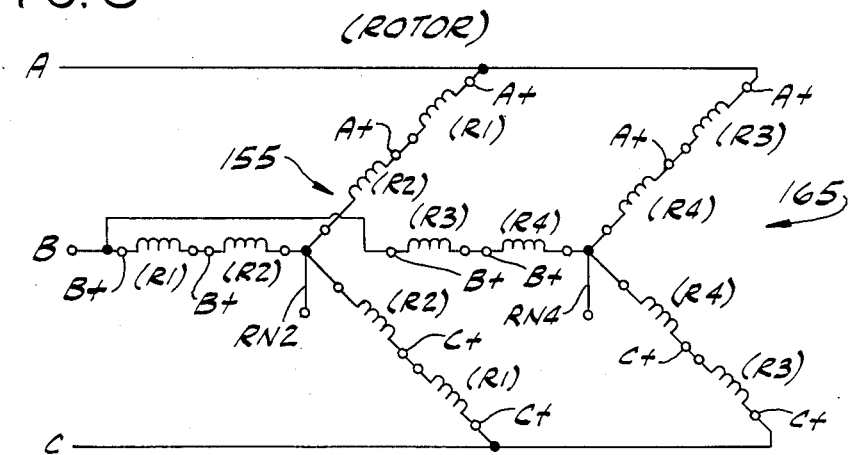
FIG. 8 is an electrical schematic diagram of the windings for the rotor of FIG. 7.

First, the windings are connected together so that only a few wires are brought out as wires 43 of FIG. 1 from the rotor R. As shown in FIG. 8, this is accomplished by wiring the winding 155 polyphase as a wye, for example, with the coil sets R1 and R2 on the opposite faces 93 and 95 in series, and by similarly wiring the winding 165 polyphase as a wye with the coil sets R3 and R4 on the opposite faces 99 and 97 in series. In other words, each wye has three legs. Each leg is formed by series connection of a coil (e.g., 157) in a coil set on a given rotor face to a corresponding coil (e.g., 157') in the coil set on the opposite rotor face. The wyes formed by windings 155 and 165 are in turn wired or connected in parallel and brought out as wires 43 from the rotor. The neutrals RN2 and RN4 of windings 155 and 165 respectively can be tied together or left floating as the skilled worker elects and may be brought out from the rotor R for external connection if desired. In FIGS. 7 and 8 the neutrals RN2 and RN4 are tied together.

The wyes are not driven independently in this embodiment since for many applications the extra degree of electrical freedom in driving them independently does not give rise to an additional degree of physical freedom. It will be apparent that the skilled worker can prepare other embodiments having other connection arrangements, such as delta instead of wye, all-series or all-parallel, and various mixtures of connection arrangements. Although it is expected that three-phase windings provide an advantageous balance between considerations of constructional simplicity and smoothness of rotor position adjustment, it is contemplated that two-phase, four-phase or other polyphase and non-polyphase connection arrangements with fewer or more coils can be implemented to achieve at least some of the objects of the invention.

Second, in the three-phase connection shown in FIG. 7, the middle coil on each rotor and stator face is connected in reverse compared to the outer coils on each rotor and stator face. This means, for example, that coil 159 is connected in a winding sense which is reversed with respect to coils 157 and 161 on rotor face 93. A current supplied into the coil 159 from terminal B sets up a magnetic flux contribution through coil 159 which is opposite in general direction (antiparallel) to the magnetic flux contribution due to a current supplied into either coil 157 or coil 161 from terminal A or terminal C respectively. In this way moving magnetic field 101 is efficiently produced when the terminals A, B, and C are simultaneously excited with three-phase electric currents, i.e. alternating currents which reach their peaks at intervals which are one-third of a cycle apart from each other. Similarly, coil 159' is connected in a winding sense which is reversed with respect to coils 157' and 161', and coils 169 and 169' are respectively connected in a winding sense which is reversed relative to coils 167, 171 and coils 167', 171'. The same arrangement is employed on the stator, so that coils 59, 59', 69 and 69' are respectively connected in a winding sense which is reversed relative to coils 57 and 61, 57' and 61', 67 and 71, and 67' and 71', respectively. The arrangements shown are only illustrative, and in other embodiments other winding connections can be used.

Third, the coils of the stator and the rotor are wound and connected so that when three-phase currents I1, I2 and I3 are all in phase (g=h=0), the rotor moves until its axis 33 coincides with the stator symmetry axis 121 (shaft straight up) and the faces 93, 95, 97, 99 of the rotor are completely aligned with the inside surfaces of the stator blocks S1–S4 as shown in FIGS. 7, 9, 10, and 11. Then the orientation angles g1 and h1 of FIGS. 3 and 4 are both zero. This orientation occurs when the rotor and stator currents in corresponding adjacent slots (e.g., A+ slot on rotor face 93 and slot 55.1 on stator block S1) are in the same direction. In other embodiments, the coils can be differently wound and connected so that the g1=h1=0 orientation occurs for some nonzero electrical phase differences g and h between the winding currents, of course.

Fourth, corresponding coils (such as 157 and 157') on opposite faces of the rotor are connected so that if one coil (157') sets up magnetic flux directed away from its face (95), the other coil (157) sets up magnetic flux directed toward the face in which that other coil rests (93). This consideration is fulfilled by all the coil pairs 157, 157', 159, 159', 161, 161', 167, 167', 169, 169', and 171, 171'. Such arrangement allows the flux to distribute itself along a low reluctance path through the rotor core 91. In other embodiments where reluctance considerations permit, or even dictate, it is contemplated that the coils are otherwise connected so that the magnetic flux is directed in the same direction relative to the surface of each face instead of opposite directions as in the embodiment illustrated herein.

Fifth, in the embodiment shown in FIGS. 7, 9, 10 and 11, the windings of the rotor are approximately symmetrical across the diameters of the rotor. Also, the windings of the stator are approximately symmetrical across the diameters of the rotor. This means for instance, that coil 157 is on the upper left in FIG. 7 and that the symmetrically corresponding coil 157' is on the lower right, while coil 161 is on the upper right and coil 161' is on the lower left. Similarly, in FIG. 10, the coil 167 is on the lower left and the symmetrically corresponding coil 167' is on the upper right, while coil 171 is on the upper left and coil 171' is on the lower right. The coils 157, 159, 161, 157', 159', and 161' as seen from the top in FIG. 7 are distributed clockwise on faces 93 and 95, and they are essentially duplicated as coils 167, 169, 171, 167', 169', and 171', also distributed clockwise, but on the faces 99 and 97, as seen from the front in FIG. 10. Other forms of coil symmetry such as bilateral symmetry of coils on opposing faces are contemplated in other embodiments. In more complex embodiments, additional coils can be added so that longitudinal and circumferential slots and windings are combined on each of one or more of the rotor faces and stator blocks.

The type of symmetry can be selected to minimize vibration of the rotor when the rotor is held adjustably fixed. Also, the type of symmetry selected can affect the uniformity of the magnetic flux density distribution in the rotor. It is desirable to keep the distribution of magnetic flux density as uniform as possible when high flux densities are to be used, in order to avoid magnetic saturation of the rotor and consequent extra $I^2R$ heating in the windings. Moreover, the effective reluctance presented by the electrical machine 11 can depend on the type of winding symmetry, and it is desirable to keep such reluctance low to minimize the current excitation needed.

FIGS. 7, 9, 10 and 11 illustrate how the windings correspond to the schematic diagram of FIG. 8 and implement the foregoing five considerations. The letters A, B, and C and arrows on the coils differentiate the various conductors in each winding and act as a step-by-step winding guide from each of the three-phase terminals for the rotor to the rotor neutrals RN2 and RN4. Such letters and arrows act as a similar guide from each of the sets of three-phase terminals respective to stator blocks S1 and S3 to the stator neutrals SN2 and SN4. As is apparent from the context, the letter A, for instance, on a rotor coil conductor does not imply any electrical connection to a conductor marked A on another rotor coil or on a stator coil unless specifically so shown. The symbols A+, A−, B+, B−, C+ and C− near the slots of stator blocks S1 and S2 and rotor faces 93 and 95 are plus for a winding direction from top to bottom and minus for a winding direction from bottom to top. The symbols A+, A−, B+, B−, C+ and C− near the slots of stator blocks S3 and S4 and rotor faces 97 and 99 are plus for a winding direction from front to rear and minus for a winding direction from rear to front.

For example, the conductive A path from the FIG. 1 rotor terminal marked "A" enters the rotor R among wires 43 of FIG. 1 and FIG. 7. The A path in FIG. 7 enters coil 157, passes from top to bottom of rotor core 91 (into the plane of FIG. 7) in the A+ slot at upper left on FIG. 7 and, continuing as part of winding 157, passes across the bottom of the rotor core as shown in bottom view FIG. 9 and then goes up the A− slot of face 93. At the top of the rotor core in FIG. 7, the A path passes back to the A+ slot and down to the bottom of the rotor core, across to the A− slot and back to the top repeatedly so that there are many conductors of the coil 157 in the A+ and A− slots of face 93. The end turn portions of the coil 157 which pass back and forth between the A+ and A− slots on the top and bottom of the rotor core 91 occupy some volume as suggested by the view in FIG. 7 of the analogous coil sets R3 and R4. Thus, the depiction of coils 157, 159, and 161 by single line width technique and suppression of detail of the conductors in the slots of faces 93 and 95, for instance, supplies diagrammatic clarity and is not intended to be pictorial.

On a last turn of coil 157 the A path passes up the A− slot of face 93 to the top of the rotor core and then leaves coil 157 among wires 175 to reach coil 157′, where the A path goes down the A+ slot of face 95 from the top of rotor core 91 to the bottom. The A path then passes along the bottom of rotor core 91 in coil 157′, enters slot A− as shown in FIG. 9, goes up the A− slot and passes over the top in FIG. 7 back to the A+ slot again. The turns go around repeatedly in coil 157′ and then the A path leaves the coil 157′ and reaches neutral RN2. This neutral is left floating or is optionally jumpered to neutral RN4 by jumpers J1 and J2.

The conductive A path among wires 177 to which wires 43 are connected, also enters coil 167 in coil set R3, passes from front to rear on rotor core 91 (into the plane of FIG. 10) in the A+ slot at lower left in FIG. 10 and passes up notch 119.4 of the rotor core in winding 167 as shown in rear view FIG. 11 and then goes from rear to front in the A− slot of face 99. At the front of the rotor core in FIG. 10, the A path passes down in notch 119.3 from the A− slot to the A+ slot and to the rear in the A+ slot again to the rear of the rotor core, up to the A− slot and forward to the front repeatedly so that there are many conductors of the coil 167 in the A+ and A− slots of face 99. The end turn portions of the coil which pass up and down between the A+ and A− slots on the rear and front of the rotor core 91 occupy some volume in notches 119.3 and 119.4 as suggested by the view in FIG. 7. Thus, the depiction of coils 167, 167′, 169, 169′, 171 and 171′ by single line width technique and suppression of detail of the conductors in the slots of faces 97 and 99 is diagrammatic.

On a last turn of coil 167 the A path passes from the A+ slot at notch 119.4 at the rear of rotor core 91 in FIGS. 7, 9 and 11, leaves coil 167 and passes diagonally along the bottom of the rotor core with the B and C paths in a wire group 181 to a front notch 119.2 and enters coil 167′ (see FIG. 10). Then the A path goes into the A+ slot of face 97 and passes from the front to the rear of rotor core 91. The A path in coil 167′ then passes up along the notch 119.1 in FIG. 11, enters the A− slot, goes forward in the A− slot and passes down notch 119.2 in FIG. 10 to the A+ slot again. The turns go around repeatedly in coil 167′ and then the A path leaves the coil 167′ from the rear in FIG. 11, passes up notch 119.1 and reaches neutral RN4.

As shown in FIG. 9, the B path among wires 19 from the terminals for stator block S1 enters coil 59, and passes from bottom to top in the B− slot of stator block S1 (into the plane of FIG. 9). In FIG. 7 the B path continues in coil 59 and passes across the top of the stator block S1 and then goes down the B+ slot. At the bottom of the stator block S1 in FIG. 9, the B path passes back to the B− slot and up to the top and across to the B+ slot and down to the bottom repeatedly so that there are many conductors of the coil 59 in the B− and B+ slots of stator block S1. The end turn portions of the coil 59 which pass back and forth between the B− and B+ slots on the top and bottom of the stator block S1 occupy some volume, and the depiction of coils 57, 57′, 59, 59′, 61 and 61′ by single line width technique and suppression of detail of the conductors in the slots of stator blocks S1 and S2 is diagrammatic.

On a last turn the B path in coil 59 in FIG. 9 passes out the bottom of the B+ slot and leaves coil 59 among wires 17 to connect to coil 59′. There the B path goes up the B− slot of stator block S2 to its top. The B path then passes in FIG. 7 from the B− slot along the top of stator block S2 in coil 59′, enters slot B+ as shown in FIG. 7, goes down the B+ slot and in FIG. 9 passes over to the B− slot of block S2 again. The turns go around repeatedly in coil 59′ and then the B conductor leaves the coil 59′ and reaches neutral SN2. This neutral is left floating or is optionally jumpered to neutral SN4.

As shown in FIG. 10, the B path among wires 23 from the terminals for stator block S3 enters coil 69 and passes from front to rear (into the plane of FIG. 10) in the B+ slot. In FIG. 11 the B path continues in coil 69 and passes down the rear of stator block S3 and then goes from rear to front in the B− slot. At the front of the stator block S3 in FIG. 10, the B path passes up from the B− slot to the B+ slot and again to the rear of the stator block S3 in the B+ slot, down to the B− slot and forward to the front repeatedly so that there are many conductors of the coil 69 in the B+ and B− slots. The end turn portions of the coil 69 which pass up and down between the B+ and B− slots on the rear and front of the stator block S3 occupy some volume but there is room between the stator blocks to accommodate, as shown in FIG. 1.

On a last turn the B path in coil 69 in FIG. 11 passes from the rear of stator block S3, leaves coil 69 and passes along the bottom rear of the electrical machine 11 with the A and C paths in wire group 21. The B path connects to coil 69′ of stator block S4 and goes into the B− slot from the rear to the front of stator block S4. The B path then passes in FIG. 10 up the front of stator block S4 in coil 69′, enters slot B+, goes rearward in the B+ slot and passes down the back (FIG. 11) to the B− slot again. The turns go around repeatedly in coil 69′ and then the B path leaves the coil 69′ from the B− slot on the front side of stator block S4 in FIG. 10 and reaches neutral SN4.

In the interests of conciseness and without sacrifice of disclosure, it is left to the reader to follow the rest of the paths in the rotor and stator windings, the descriptions of which are similar to the example descriptions given above.

The magnetically permeable rotor core 91 is made in a mold from sintered powdered iron composition with preferably isotropic, high permeability magnetic properties. Alternatively, laminations of electrical grade silicon steel or high permeability alloy are provided.

Figure 12:
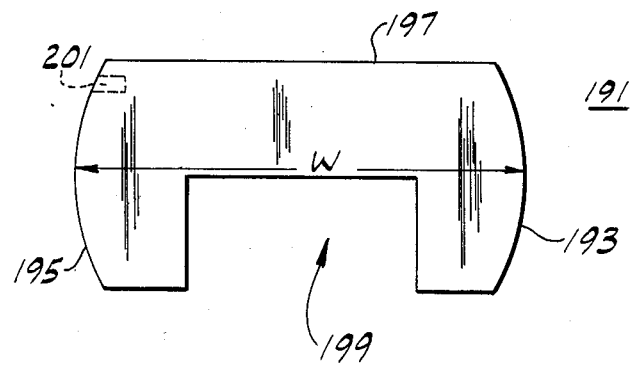
FIG. 12 depicts a lamination for a magnetically permeable core of the rotor of FIG. 7.

In the lamination approach, the quadruple-winged shape of rotor core 91 is readily achieved by making two "C" shaped stacks of laminations. Each lamination 191 has the general C-shape shown in FIG. 12 with wings 193 and 195 joined by a section 197 defined by an indent 199. A width W of each lamination 191 is varied in a first stack to form slots and shoulders of faces 93 and 95 for the longitudinal coil sets R1 and R2 of FIG. 7. A series of rectangular notches of a form suggested by a dashed line 201 in FIG. 12 are provided in laminations for a second stack to form the slots of faces 97 and 99 for the circumferential coil sets R4 and R3 of FIG. 10. In construction, the two stacks of laminations are oriented transverse to each other with their indents 199 of FIG. 12 facing each other. The transverse stacks are pressed home as indicated in FIG. 3 to complete the rotor core 91.

Figure 13:
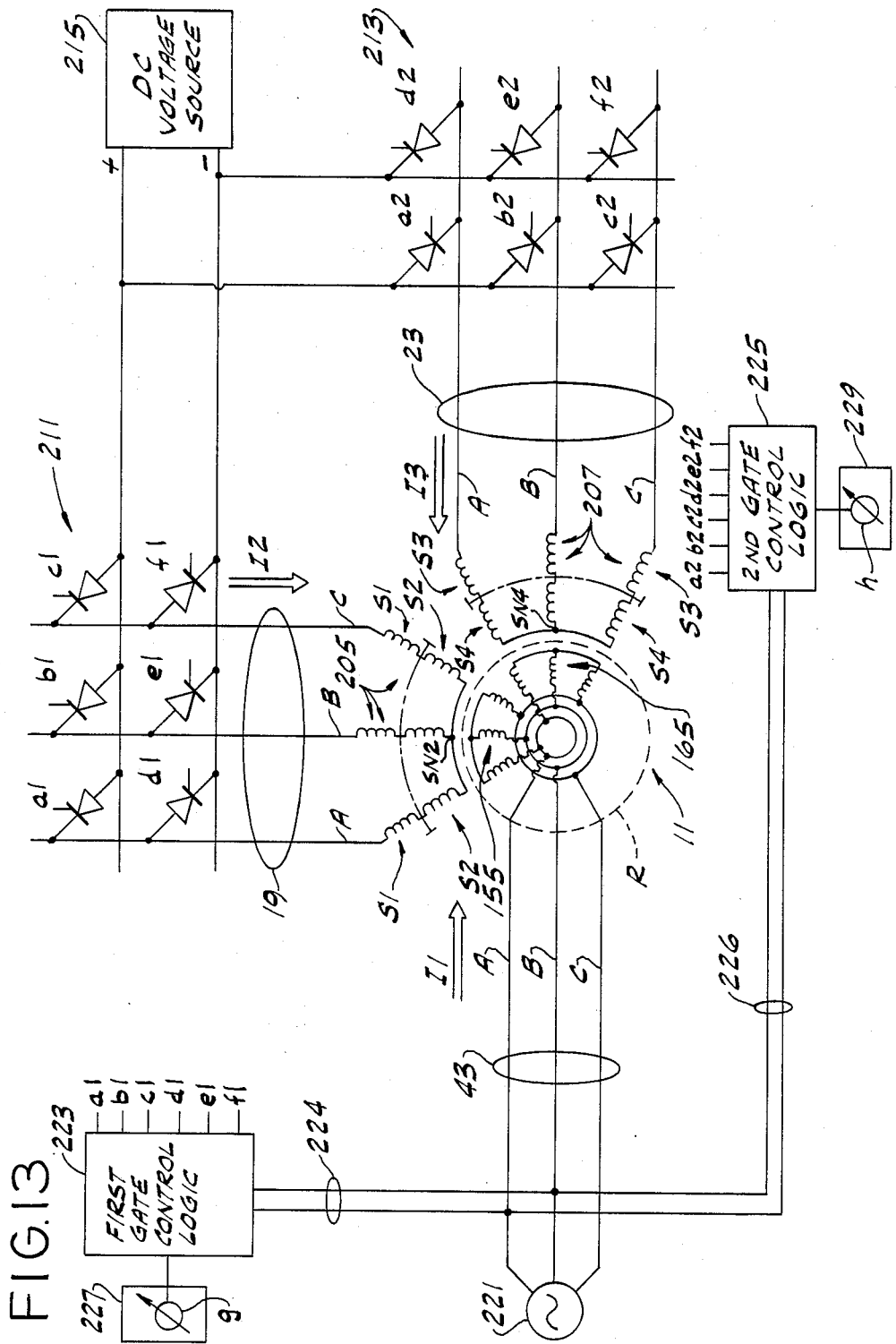
FIG. 13 is a schematic diagram of electrical apparatus of the invention including a circuit for adjustably controlling the relative phases of a set of the alternating currents of FIG. 5, with the electrical machine of FIG. 1 shown in schematic form and connected to the controlling circuit.

In FIG. 13, two three-phase stator windings 205 and 207 are schematically shown for the pair of stator blocks S1, S2 and the pair of stator blocks S3, S4. Windings 205 and 207 are connected by cables 19 and 23 respectively to two three-phase solid-state switching bridges 211 and 213 which are in turn fed from a DC voltage source 215. Rotor R with its two three-phase windings 155 and 165 is connected to a three-phase AC source 221 by wires 43.

The stator windings constitute a second winding assembly that includes third polyphase winding 205 (e.g. in addition to windings 155 and 165 of the rotor which are energized with polyphase electric currents) for conducting second polyphase electric currents I2 from the controlling means and fourth polyphase winding 207 for conducting third polyphase electric currents I3 from the controlling means. The third and fourth polyphase windings have at least some electrically independent terminals so that they are energizable independently of each other at least in electrical phase angle relative to the first winding assembly (e.g. on rotor R).

The bridges 211 and 213 each have six solid-state switching devices such as thyristors or transistors. Two sets of six gates (control terminals) a1–f1 and a2–f2 of the switching devices are driven respectively by first and second gate control logic circuits 223 and 225. The first and second gate control logic circuits 223 and 225 have zero crossing detector circuits internal to them which obtain timing from source 221 on lines 224 and 226. The zero crossing detector circuits are followed by variable delay circuits 227 and 229 for setting the electrical phase angles g and h of FIG. 5.

A counter in each control logic circuit 223 and 225 repeatedly counts up from zero over a time period equal to the reciprocal of the frequency of the source 221 and then is reset to repeat the count. The output of each delay circuit causes the instant of counter reset to be offset by the appropriate phase angle g or h from each zero crossing. The counter in each control logic circuit in turn drives decoding logic feeding the bridge gates. As the counter counts up, it produces successive binary values that are decoded to drive pairs of the gates of each bridge in a predetermined sequence to cyclically energize the windings in three-phase manner. In this way the bridges 211 and 213 have two at a time of their switching devices turned on to energize pairs of the coils in each stator winding 205 and 207 in a preselected sequence which is determined by the counter and the decoding circuitry. Although the switching devices have an on-off operation, the self-inductance of the windings approximately integrates the voltages supplied to them so that approximately sinusoidal currents flow. In other words, the windings 205 and 207 low-pass filter the switched voltage supplied to them.

When the three-phase sinusoidal currents I1, I2, and I3 flow in the electrical machine 11, rotor R moves adjustably to an orientation having orientation angles g1 and h1 depending on the settings of variable delay circuits 227 and 229. Each stator, or outer shell, winding 205 and 207 induces three-phase voltages in the rotor, or inner shell, windings 155 and 165. The inner windings 155 and 165 are also energized but with at least phase displacement in time, so that they are out of phase with the induced voltages. Thus, circulating currents produce a force such as to align the rotor with respect to the stator windings in an orientation that cancels out the circulating currents if there is no load on the machine.

Together, bridges 211 and 213 with first and second gate control logic circuits 223 and 225 and variable delay circuits 227 and 229 constitute means for adjustably controlling the relative phases of a set of alternating currents, in this case a set of three polyphase alternating currents or 9 currents in all. Bridges 211 and 213 with first and second gate control logic circuits 223 and 225 and variable delay circuits 227 and 229 together with wires 43, 19 and 23 also constitute means for energizing the winding arrangement of the stator and the first and second windings of the rotor with polyphase electric currents.

The polyphase currents are advantageously derived from just one separate three-phase source 221. Where three-phase power is unavailable from power lines, the three-phase source 221 converts single phase power to three-phase by power electronics duplicating bridge 211 combined with gate control logic 223.

Figure 14:
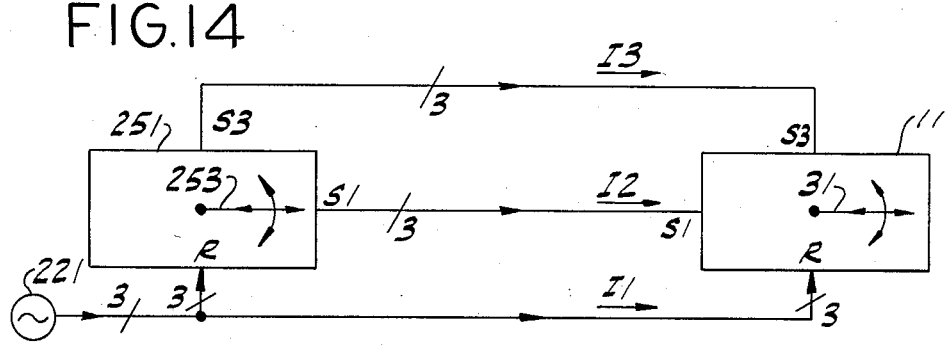
FIG. 14 is a schematic diagram of electrical apparatus of the invention including two of the electrical machines of FIG. 1 connected together in a selsyn arrangement.

In FIG. 14, electrical machine 11 is driven by an electrical machine 251 which is identical to electrical machine 11. Electrical machine 251, however, acts as the means for adjustably controlling the relative phases of the three sets of polyphase alternating currents I1, I2, and I3 of FIG. 5. The stator block S1 winding terminals of machine 251 are connected by three wires (indicated by "/3" bus notation) to the stator block S1 winding terminals of machine 11, and the stator block S3 winding terminals of machine 251 are connected by another three wires to the stator block S3 winding terminals of machine 11. The rotors R of both machines 11 and 251 are connected in parallel to the three-phase source 221.

Machine 251 acts as an adjustable transformer which produces polyphase currents I2 and I3 corresponding to the position of a mechanically adjustable rotor shaft 253 which corresponds to shaft 31 of machine 11. Shaft 31 of machine 11 moves in a manner which is a function of the position of shaft 253 of machine 251. The invention is thus seen to be very versatile. Moreover, when the S1 and S3 terminals of machine 251 are alternatively connected to the S3 and S1 terminals of machine 11 respectively, the machines transform the orientation of shaft 253 to shaft 31 so that the tilt angle h1 of shaft 31 is a function of azimuth angle g1 of shaft 253 and the azimuth angle g1 of shaft 31 is a function of the tilt angle h1 of shaft 253.

Figure 15:
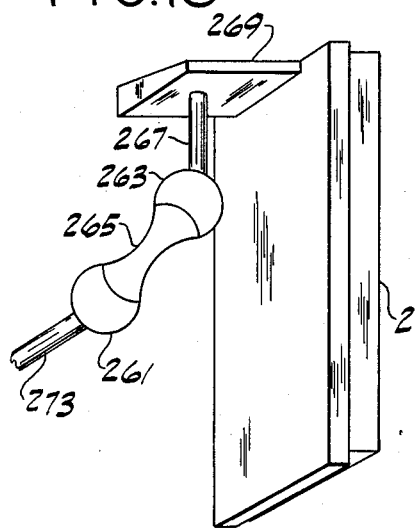
FIG. 15 is a perspective view of two of the electrical machines of FIG. 1 physically attached for robotics and other applications.

FIG. 15 shows two electrical machines 261 and 263 constructed like machine 11 but having molded exteriors mechanically joined to each other at a linkage 265. The machines 261 and 263 are suspended by a rotor shaft 267 of machine 263 from a beam 269 which is affixed to a base support 271. A rotor shaft 273 of machine 261 is connected to means for handling or processing objects in robotics or other servomechanical applications. For instance, machine 261 can be an artificial wrist or ankle analog and machine 263 can be an artificial knee, hip, elbow or shoulder analog.

Figure 16:
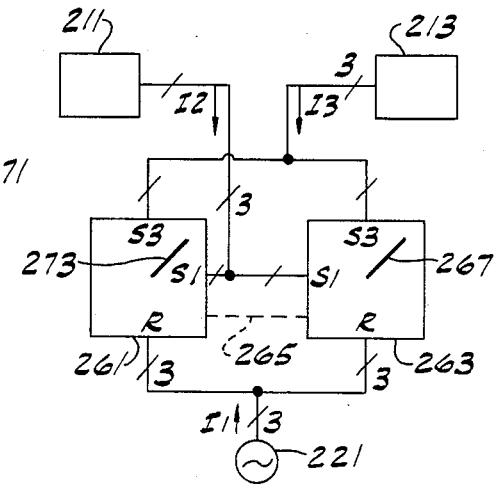
FIG. 16 is a block diagram of an example of electrical connections for the electrical machines of FIG. 15.

In an example of electrical connections, shown in FIG. 16, a three-phase source 221 (compare FIG. 13) is connected to the rotors R of both machines 261 and 263 of FIG. 15. Corresponding S1 terminals of both machines are connected together to bridge 211, and corresponding S3 terminals of both machines are connected together to bridge 213.

Figure 17:
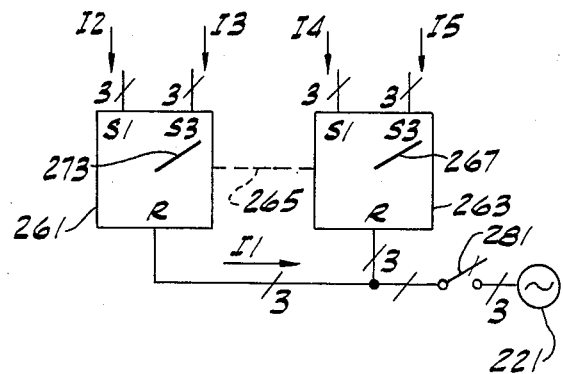
FIG. 17 is a block diagram of another example of electrical connections for the electrical machines of FIG. 15.

In another example of electrical interconnections shown in FIG. 17, the rotors R of both machines 261 and 263 are connected together and either driven by source 221 or left floating as indicated by an open three-pole-single-throw switch 281. The stators are independently driven by four bridges and gate control logic circuits each being of the type of bridge 211 and gate control logic 223 and providing independently adjustable three-phase current sets I2, I3, I4, and I5.

Each electrical machine is not only an electrical building block but also a mechanical building block in FIG. 15. This is because the motions obtainable at robotic working shaft 273 not only depend on the electrical connections but also the relative physical orientations of the stators of the electrical machines 261 and 263 to each other, as defined by linkage 265. The maneuvers of shaft 273 relative to base support 271 are a composite of the maneuvers of shaft 273 relative to machine 263 and the maneuvers of shaft 267 to machine 261. The maneuvers of each machine relative to its stator are illustrated by FIG. 6, but the maneuvers of two or more such machines are a complex three-dimensional composite defined by but more extensive than the capabilities of any one of the electrical machines.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrical machine comprising:
   a first assembly including first and second windings both of which windings are approximately equally displaced from an axis, said first winding having conductors which are approximately parallel to the axis over most of their length, and the second winding having conductors which are approximately perpendicular to the axis over most of their length; and
   a second assembly surrounding the first assembly and having a winding arrangement, the first assembly being rotatable within the second assembly around more than one axis upon electrical energization of said winding arrangement and of said first and second windings in said first assembly and said first assembly further including means for holding said first and second windings apart.

2. An electrical machine as set forth in claim 1 wherein sasids first winding is a polyphase winding.

3. An electrical machine as set forth in claim I wherein said second winding is a polyphase winding.

4. An electrical machine as set forth in claim 1 wherein said first and second windings are each polyphase windings.

5. An electrical machine as set forth in claim 1 wherein the winding arrangement of the second assembly is a polyphase winding arrangement and the first and second windings of the first assembly are each polyphase windings, and the electrical machine further comprises means for energizing said winding arrangement and said first and second windings with polyphase electric currents.

6. An electrical machine as set forth in claim 1 wherein said holding means further includes a magnetically permeable core having a first face with slots which are approximately parallel to the axis, the first winding conductors resting in the slots of the first face, the core also having a second face with slots which are approximately perpendicular to the axis, the second winding conductors resting in the slots of the second face.

7. An electrical machine as set forth in claim 1 wherein said holding means further includes a magnetically permeable core having a first pair of faces with slots which are approximately parallel to the axis, the first winding having at least three overlapping parts resting in the slots of the first pair of faces, the core having a second pair of faces with slots which are approximately perpendicular to the axis, and the second winding having at least three overlapping parts resting in the slots of the second pair of faces.

8. An electrical machine comprising:
   a first assembly including first and second windings both of which windings are approximately equally displaced from an axis, said first winding having conductors which are approximately parallel to the axis over most of their length, and the second winding having conductors which are approximately perpendicular to the axis over most of their length; and
   a second assembly surrounding the first assembly and having a winding arrangement, the first assembly being rotatable within the second assembly around more than one axis upon electrical energization of said winding arrangement and of said first and second windings in said first assembly wherein said winding arrangement of said second assembly includes third and fourth windings and said second assembly further includes means for holding said third and fourth windings apart.

9. An electrical machine as set forth in claim 8 wherein said third and fourth windings are each polyphase windings.

10. An electrical machine as set forth in claim 9 wherein said third and fourth polyphase windings are approximately perpendicular to each other.

11. An electrical machine as set forth in claim 9 wherein said first and second windings are each polyphase windings.

12. An electrical machine as set forth in claim 8 wherein said first assembly is rotatable to a position relative to said second assembly at which position said first and third windings lie adjacent to each other and said second and fourth windings lie adjacent to each other.

13. An electrical machine as set forth in claim 8 wherein said first assembly further includes means for holding said first and second windings apart.

14. An electrical machine as set forth in claim 8 wherein said third and fourth windings each have conductors and said holding means includes a first magnetically permeable block with approximately parallel slots, said third winding conductors resting in the slots of said first block, said holding means also including a second magnetically permeable block with slots which are approximately parallel to each other and approximately perpendicular to the slots of said first block, said fourth winding conductors resting in the slots of said second block.

15. An electrical machine as set forth in claim 14 wherein said first assembly further includes a magnetically permeable core having a first face with slots which are approximately parallel to the axis, the first winding conductors resting in the slots of the first face, the core also having a second face with slots which are approximately perpendicular to the axis, the second winding conductors resting in the slots of the second face.

16. An electrical machine as set forth in claim 8 wherein said holding means includes a first magnetically permeable block with approximately parallel slots, said third winding having at least three overlapping parts resting in the slots of said first block, said holding means also including a second magnetically permeable block with slots which are approximately parallel to each other and approximately perpendicular to the slots of said first block, said fourth winding having at least three overlapping parts resting in the slots of said second block.

17. An electrical machine as set forth in claim 16 wherein said first assembly further includes a magnetically permeable core having a first pair of faces with slots which are approximately parallel to the axis, the first winding having at least three overlapping parts resting in the slots of the first pair of faces, the core having a second pair of faces with slots which are approximately perpendicular to the axis, and the second winding having at least three overlapping parts resting in the slots of the second pair of faces.

18. An electrical machine for use with means for adjustably controlling the relative phases of a set of alternating currents, the electrical machine comprising a rotor having a first winding assembly and a stator having a second winding assembly, the rotor being free to rotate inside of the stator around more than one axis and wherein said rotor has diameters and said first winding assembly is approximately symmetrical across the diameters of said rotor, the first and second winding assemblies having terminals for connection to the controlling means and being arranged so that the alternating currents flow in the first and second winding assemblies to produce a first magnetic filed moving approximately circumferentially over the rotor and correspondingly along the stator, and to simultaneously produce a second magnetic field moving approximately longitudinally elsewhere over the rotor and moving correspondingly along the stator, the first and second moving magnetic fields holding the rotor in a fixed position relative to the stator which position is adjustable by adjusting at least the relative phases of the currents from the controlling means flowing in the first and second winding assemblies.

19. An electrical machine as set forth in claim 18 wherein said second winding assembly is approximately symmetircal across the diameters of said rotor.

20. An electrical machine for use with means for adjustably controlling the relative phases of a set of alternating currents, the electrical machine comprising a rotor having a first winding assembly and a stator having a second winding assembly, the rotor being free to rotate inside of the stator around more than one axis, wherein said rotor includes a magnetically permeable core having a first pair of faces with slots which are approximately longitudinal and a second pair of faces with slots which are approximately circumferential, the first and second winding assemblies having terminals for connection to the controlling means and being arranged so that the alternating currents flow in the first and second winding assemblies to produce a first magnetic field moving approximately circumferentially over the rotor and correspondingly along the stator, and to simultaneously produce a second magnetic field moving approximately longitudinally elsewhere over the rotor and moving correspondingly along the stator, the first and second moving magnetic fields holding the rotor in a fixed position relative to the stator which position is adjustable by adjusting at least the relative phases of the currents from the controlling means flowing in the first and second winding assemblies.

21. An electrical machine as set forth in claim 20 wherein said first pair of faces are opposite each other on the rotor and said second pair of faces are also opposite each other on the rotor.

22. An electrical machine as set forth in claim 20 wherein the first winding assembly includes a first winding having at least three overlapping parts resting in the slots of the first pair of faces and a second winding having at least three overlapping parts resting in the slots of the second pair of faces.

23. An electrical machine as set forth in claim 22 wherein said first winding includes a polyphase winding and said second winding includes a polyphase winding connected to said first winding.

24. An electrical machine as set forth in claim 18 wherein said first winding assembly includes a first polyphase winding and a second polyphase winding connected together.

25. An electrical machine as set forth in claim 24 wherein said second winding assembly includes a third polyphase winding for conducting second polyphase electric currents from the controlling means and a fourth polyphase winding for conducting third polyphase electric currents from the controlling means, the third and fourth polyphase windings having at least some electrically independent terminals so that the third and fourth polyphase windings are energizable independently of each other at least in electrical phase angle relative to said first winding assembly.

26. An electrical machine as set forth in claim 18 wherein said second winding assembly includes a first polyphase winding and a second polyphase winding for conducting independent polyphase electric currents from the controlling means.

27. Electrical apparatus comprising:
means for adjustably controlling the relative phases of a set of alternating currents; and
an electrical machine including a rotor having a first winding assembly and a stator having a second winding assembly, the rotor being free to rotate inside of the stator around more than one axis wherein said rotor has diameters and said first winding assembly is approximately symmetrical across the diameters of said rotor, the first and second winding assemblies being connected to said controlling means and arranged so that the alternating currents flow in the first and second winding assemblies to produce a first magnetic field moving approximately circumferentially over the rotor and corresponding along the stator, and to simultaneously produce a second magnetic field moving approximately longitudinally elsewhere over the rotor and moving correspondingly along the stator, the first and second moving magnetic fields holding the rotor in a fixed position relative to the stator which position is adjustable by adjusting at least the relative phases of the currents from said controlling means flowing in the first and second winding assemblies.

* * * * *

UNITED STATES PATENT AND TRADEMARK OFFICE
CERTIFICATE OF CORRECTION

PATENT NO. : 4,719,381
DATED : January 12, 1988
INVENTOR(S) : Arturo R. Miles

It is certified that error appears in the above—identified patent and that said Letters Patent is hereby corrected as shown below:

Column 16, claim 2, line 20, "sasids" should read --said--. Column 20, claim 27 line 8, "corresponding" should read --correspondingly--.

Signed and Sealed this

Sixteenth Day of August, 1988

Attest:

DONALD J. QUIGG

Attesting Officer      Commissioner of Patents and Trademarks